US010542219B2

United States Patent
Tomiyama

(10) Patent No.: US 10,542,219 B2
(45) Date of Patent: Jan. 21, 2020

(54) INFORMATION COLLECTING APPARATUS, INFORMATION COLLECTING SYSTEM AND INFORMATION COLLECTING METHOD

(71) Applicant: TOSHIBA TEC KABUSHIKI KAISHA, Tokyo (JP)

(72) Inventor: Takashi Tomiyama, Nagaizumi Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/875,663

(22) Filed: Jan. 19, 2018

(65) Prior Publication Data
US 2018/0213160 A1  Jul. 26, 2018

(30) Foreign Application Priority Data

Jan. 20, 2017 (JP) ................................ 2017-008631

(51) Int. Cl.
*H04N 5/232* (2006.01)
*G06Q 10/08* (2012.01)
*G05B 19/402* (2006.01)
*G06K 9/00* (2006.01)
*H04N 7/18* (2006.01)
*G01B 21/16* (2006.01)
*G01J 5/00* (2006.01)

(52) U.S. Cl.
CPC ....... *H04N 5/23296* (2013.01); *G05B 19/402* (2013.01); *G06K 9/00664* (2013.01); *G06Q 10/087* (2013.01); *H04N 7/183* (2013.01); *G01B 21/16* (2013.01); *G01J 5/0003* (2013.01); *G05B 2219/40572* (2013.01)

(58) Field of Classification Search
CPC combination set(s) only.
See application file for complete search history.

(56) References Cited

U.S. PATENT DOCUMENTS

| 8,150,658 | B2 | 4/2012 | Beniyama et al. |
| 2008/0077511 | A1 | 3/2008 | Zimmerman |
| 2009/0326709 | A1 | 12/2009 | Hooper et al. |
| 2010/0017407 | A1* | 1/2010 | Beniyama .......... G06K 9/00201 707/E17.016 |
| 2015/0073589 | A1 | 3/2015 | Khodl et al. |
| 2015/0375398 | A1 | 12/2015 | Penn et al. |
| 2016/0327383 | A1* | 11/2016 | Becker ................. G01B 11/005 |

FOREIGN PATENT DOCUMENTS

JP  2010-023950  2/2010

OTHER PUBLICATIONS

Extended European Search Report dated Jun. 27, 2018 in corresponding European Patent Application No. 18152251.7 (Publication No. EP 3352118 A1), 12 pages.

* cited by examiner

*Primary Examiner* — Janese Duley
(74) *Attorney, Agent, or Firm* — Kim & Stewart LLP

(57) ABSTRACT

In one embodiment, an information collecting apparatus has a sensor, an arm, an arm drive mechanism, and a processor. The processor controls the arm drive mechanism to make the arm operate, and thereby makes the sensor move in the vicinity of an article arranged in a shelf. The processor acquires information indicating a state of the article to be measured by the sensor.

19 Claims, 17 Drawing Sheets

| | | 213 |
|---|---|---|
| OPERATION TYPE | | INVENTORY |
| SENSOR TYPE | | CAMERA |
| OPERATION ID | | 002 |
| NUMBER OF STORAGE POSITIONS | | 6 |
| 1 | SHELF NUMBER - STAGE NUMBER - LINE NUMBER | B-03-01 |
| 2 | SHELF NUMBER - STAGE NUMBER - LINE NUMBER | B-03-02 |
| 3 | SHELF NUMBER - STAGE NUMBER - LINE NUMBER | B-02-01 |
| 4 | SHELF NUMBER - STAGE NUMBER - LINE NUMBER | B-02-02 |
| 5 | SHELF NUMBER - STAGE NUMBER - LINE NUMBER | B-01-01 |
| 6 | SHELF NUMBER - STAGE NUMBER - LINE NUMBER | B-01-02 |
| MOVEMENT SPEED OF MOVEMENT MECHANISM | | 30cm/s |

Fig.8

| STORAGE POSITION ID | | | STARTING POSITION | DIRECTION | DEPTH | WIDTH OF LINE |
|---|---|---|---|---|---|---|
| SHELF NUMBER | STAGE NUMBER | LINE NUMBER | | | | |
| A | 1 | 1 | 200,600,60 | 90 | 60 | 50 |
| A | 1 | 2 | 260,600,60 | 90 | 60 | 50 |
| A | 1 | 3 | 320,600,60 | 90 | 60 | 50 |
| A | 2 | 1 | 200,600,120 | 90 | 60 | 50 |
| A | 2 | 2 | 260,600,120 | 90 | 60 | 50 |
| A | 2 | 3 | 320,600,120 | 90 | 60 | 50 |
| ... | ... | ... | ... | ... | ... | ... |
| B | 1 | 1 | 200,300,60 | 180 | 60 | 50 |
| B | 1 | 2 | 260,300,60 | 180 | 60 | 50 |
| ... | ... | ... | ... | ... | ... | ... |

Fig.9

| ARTICLE NUMBER | FEATURE INFORMATION | SIZE (LENGTH) | SIZE (WIDTH) | SIZE (HEIGHT) | STORAGE POSITION ID |
|---|---|---|---|---|---|
| 2200001 | REFER TO FEATURE DATABASE | 20 | 20 | 15 | A-3-1 |
| 2200002 | REFER TO FEATURE DATABASE | 20 | 20 | 15 | A-3-1 |
| 2200003 | REFER TO FEATURE DATABASE | 20 | 20 | 15 | A-3-2 |
| ... | ... | ... | ... | ... | ... |

| ARTICLE NUMBER | THEORETICAL STOCK NUMBER | READ NUMBER | DIFFERENCE |
|---|---|---|---|
| 2200001 | 10 | 10 | 0 |
| 2200002 | 20 | 19 | 1 |
| 2200003 | 15 | 15 | 0 |
| ⋮ | ⋮ | ⋮ | ⋮ |

Fig.14

INFORMATION COLLECTING APPARATUS, INFORMATION COLLECTING SYSTEM AND INFORMATION COLLECTING METHOD

CROSS-REFERENCE TO RELATED APPLICATION

This application is based upon and claims the benefit of priority from the prior Japanese Patent Application No. 2017-008631, filed on Jan. 20, 2017, the entire contents of which are incorporated herein by reference.

FIELD

Embodiments described herein relate generally to an information collecting apparatus, an information collecting system, and an information collecting method.

BACKGROUND

In a retail store or the like, management of commodities arranged in a shelf is necessary. For example, an inventory operation takes time and labor, and accordingly it is an operation requiring large load for a salesclerk. Conventionally, there is an inventory system which counts the number of articles using an object sensor for measuring a distance to an object and a movement mechanism for moving the object sensor. This inventory system determines actual arrangement data of objects, based on data which a distance sensor fixed to a main body moving in front of the shelf measures.

The inventory system with the configuration like this cannot detect a state of an article arranged behind an article arranged at the front, by the distance sensor. In an actual retail store or the like, it is common to arrange a plurality of articles of the same kind arranged in a line in a shelf from the front toward the back in a forward display state for the front surface of the shelf. For the reason, it is difficult for the conventional inventory system to correctly count the number of articles arranged in a shelf of an actual retail store or the like.

BRIEF DESCRIPTION OF THE DRAWINGS

FIG. 8 is a diagram showing an example of operation instruction information for instructing an operation to the information collecting apparatus according to the embodiment.

FIG. 9 is a diagram showing an example of shelf information to which the information collecting apparatus according to the embodiment refers.

FIG. 12 is a diagram showing an example of article information to which the information collecting apparatus according to the embodiment refers.

FIG. 14 is a diagram showing an example of information indicating a result of an inventory operation by the information collecting apparatus according to the embodiment.

DETAILED DESCRIPTION

According to one embodiment, an information collecting apparatus collects information of an article arranged in a shelf. The information collecting apparatus has a sensor, an arm, an arm drive mechanism, and a processor. The sensor measures a state of the article arranged in the shelf. The arm supports the sensor. The arm drive mechanism makes the arm operate. The processor controls the arm drive mechanism to make the arm operate, and thereby makes the sensor move in the vicinity of the article arranged in the shelf. Further, the processor acquires information indicating the state of the article to be measured by the sensor.

Figure 1:
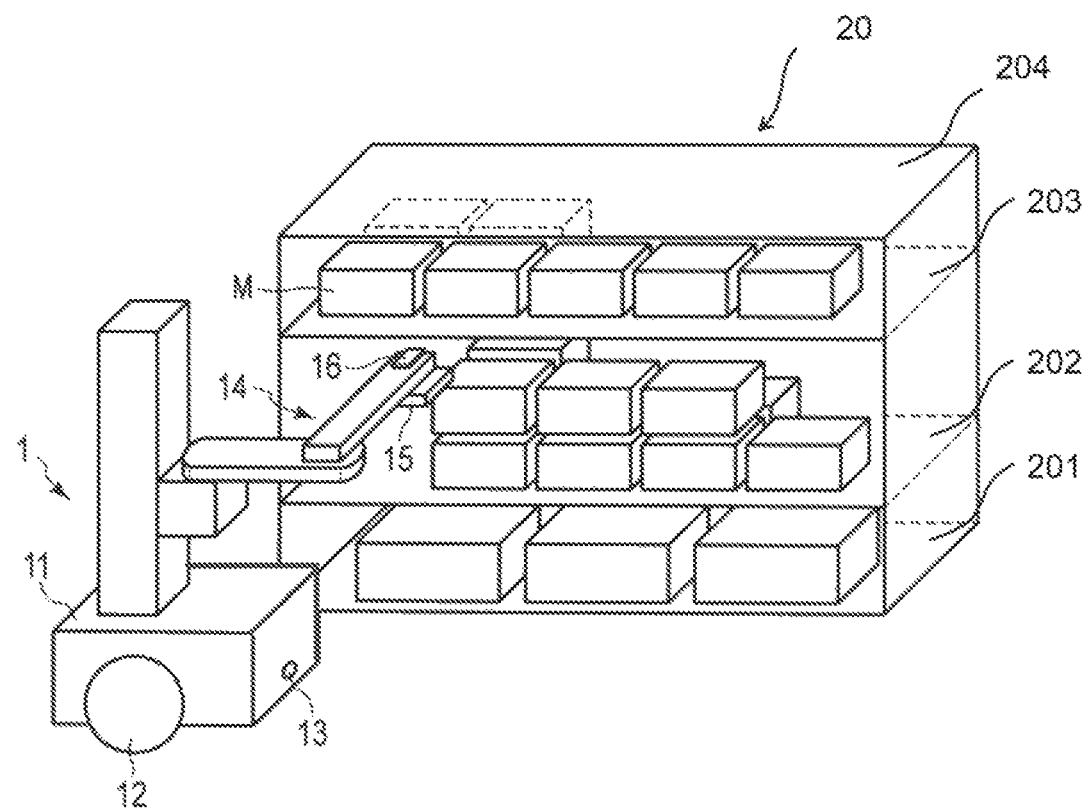
FIG. 1 is an outer appearance diagram showing an information collecting apparatus according to an embodiment.
Figure 2:
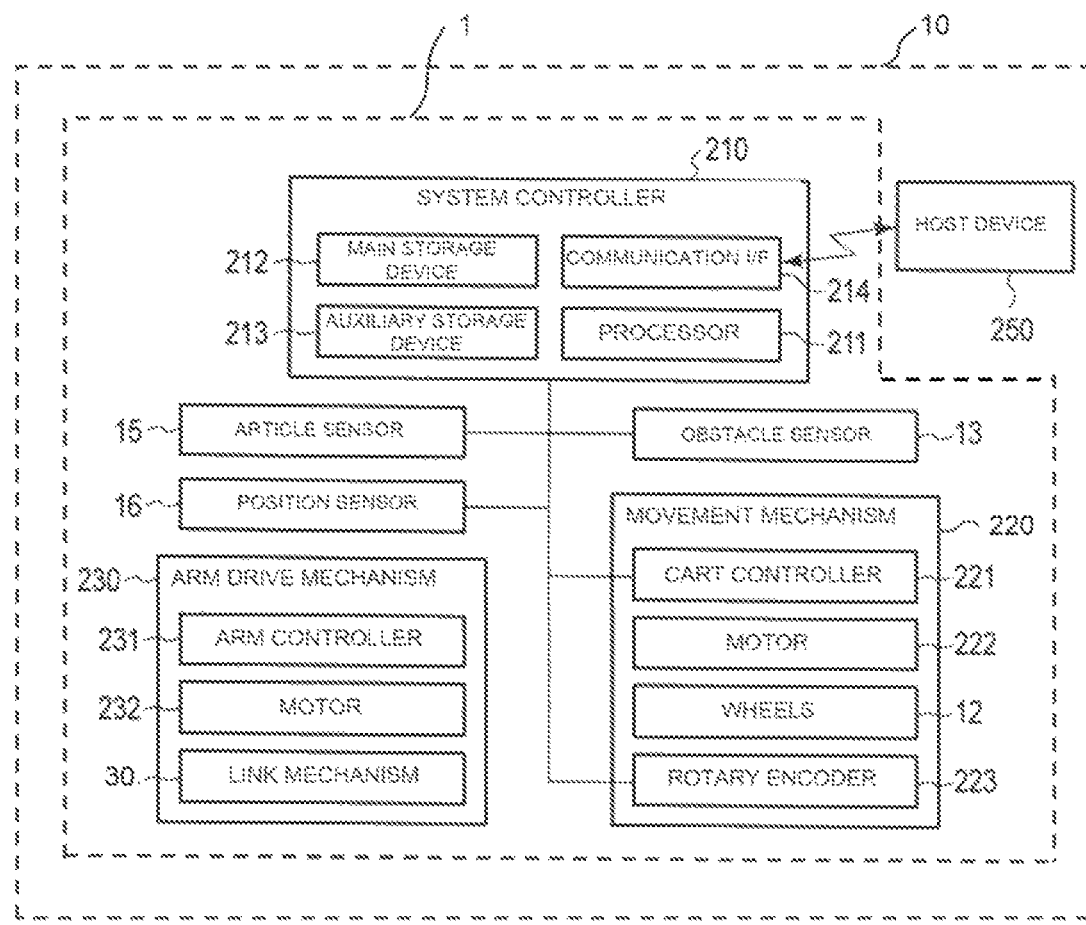
FIG. 2 is a block diagram showing a control system of the information collecting apparatus according to the embodiment.

Hereinafter, an embodiment will be described with reference to the drawings. In the drawings, the same symbols indicate the same or the similar portions. To begin with, an information collecting apparatus 1 according to the present embodiment will described. FIG. 1 is a diagram showing an outer appearance of the information collecting apparatus 1 according to the present embodiment. In addition, FIG. 2 is a block diagram showing a control system of the information collecting apparatus 1 according to the present embodiment. As shown in FIG. 1, the information collecting apparatus 1 has a main body 11, wheels 12 (only one of them is shown), an obstacle sensor 13, an arm 14, an article sensor 15 and a position sensor 16. Further, the information collecting apparatus 1 has a system controller 210, a movement mechanism 220, and an arm drive mechanism 230, as shown FIG. 2.

The wheels 12, the obstacle sensor 13, the arm 14, and a link mechanism 30 of the arm drive mechanism 230 (refer to FIG. 3) are attached to the main body 11. In addition, the main body 11 houses the system controller 210, the movement mechanism 220, and a part of the arm drive mechanism 230 therein. The wheels 12 are attached to the main body 11. The wheels 12 are rotated by drive control of the movement mechanism 220. The wheels 12 are rotated to make the main body 11 move. In the present embodiment, the main body 11 shall move in an area at the front side of a shelf 20 in which articles M are to be stored, by the rotation of the wheels 12. Further, in the present embodiment, the shelf 20 has a plurality of shelf boards 201, 202, 203 on which the articles M are to be arranged for storing the articles M, and a top board 204. The obstacle sensor 13 is a sensor for detecting an obstacle. The obstacle sensor 13 is attached to the main body 11. The obstacle sensor 13 is provided at a front surface portion of the main body 11 in the moving direction by the wheels 12, as shown in FIG. 1, for example.

The arm 14 is attached to the main body 11. Specifically, in the present embodiment, the arm 14 is installed above the main body 11, via a vertical movement mechanism 302 (refer to FIG. 3). The arm 14 has a first arm 14a, a second arm 14b, and an arm support 14c. The first arm 14a is coupled to the second arm 14b via a first joint mechanism 301a. The first arm 14a rotates in the direction of an arrow A of FIG. 3 around the rotation axis, with respect to the second arm 14b. The second arm 14b is coupled to the arm support 14c via a second joint mechanism 301b. The second arm 14b rotates in the direction of an arrow B of FIG. 3 around the rotation axis, with respect to the arm support 14c. The arm support 14c is moved in the direction of an arrow C by the vertical movement mechanism 302. That is, the arm 14 moves (rotates) in the direction of the arrow A and in the direction of the arrow B, and thereby moves in the horizontal direction, and the arm 14 moves in the direction of the arrow C, and thereby moves in the vertical direction. The arm 14 operates (moves) as described above by the drive control of the arm drive mechanism 230. In addition, the article sensor 15 and the position sensor 16 are supported to the arm 14 (the first arm 14a). The arm drive mechanism 230 moves the arm 14 so as to insert the article sensor 15 inside the shelf 20 in which the articles M are to be arranged.

The article sensor 15 is a device for acquiring information indicating a state of the article M. The article sensor 15 moves a measurement portion in accordance with the movement of the arm 14, to measure the information indicating the state of the article M. The position sensor 16 is a device for detecting information for determining a position of the arm 14. Specific configuration examples of the article sensor 15 and the position sensor 16 will be described later.

The system controller 210 performs operation control of the respective portions and information processing. The movement mechanism 220 drives the wheels 12, to move the main body 11. The arm drive mechanism 230 drives the link mechanism 30 of the arm 14, to make the arm 14 to be operated (moved). For example, the system controller 210 controls the movement of the main body 11 by the movement mechanism 220 with reference to the information or the like which the obstacle sensor 13 detects. The system controller 210 controls the movement of the arm 14 by the arm drive mechanism 230 with reference to the information or the like which the position sensor 16 detects. The system controller 210 acquires the information which the article sensor 15 measures, and performs information processing based on the information acquired from the article sensor 15.

The system controller 210 of the information collecting apparatus 1 is a device which can communicate with a host device 250, as shown in FIG. 2. An information collecting system 10 according to the present embodiment has the information collecting apparatus 1 and the host apparatus 250, as shown in FIG. 2. The host apparatus 250 is a computer having a processor, a memory, a communication interface, and so on. The processor executes a program stored in the memory, and thereby the host apparatus 250 realizes various processing functions. For example, the host apparatus 250 processes information transmitted from the information collecting apparatus 1, and delivers information to the information collecting apparatus 1.

The host apparatus 250 may receive information from the information collecting apparatus 1, and may perform information processing based on the information received from the information collecting apparatus 1. In this case, the host apparatus 250 may perform a part of the processing described later which the system controller 210 of the information collecting apparatus 1 executes. For example, the host apparatus 250 may receive information which the article sensor 15 measures from the information collecting apparatus 1, and may perform information processing based on the information which the article sensor 15 has measured. In addition, the host apparatus 250 may supply data for operation control or information processing to the information collecting apparatus 1. For example, the host apparatus 250 may supply an operation instruction to the information collecting apparatus 1. In this case, the system controller 210 controls the operation of the respective portions in accordance with the operation instruction from the host apparatus 250.

Next, the system controller 210 will be described. As shown in FIG. 2, the system controller 210 has a processor 211, a main storage device 212, an auxiliary storage device 213, and a communication interface (I/F) 214. The processor 211 is a CPU (Central Processing Unit), for example. The processor 211 executes a program to realize various processing functions. The main storage device 212 is a memory for the processor 211 to execute the processing, such as a ROM (Read Only Memory) and a RAM (Random Access Memory), for example. The ROM as the main storage device 212 stores a program which the processor 211 executes. The RAM as the main storage device 212 stores working data and so on.

The auxiliary storage device 213 is a rewritable nonvolatile memory. The auxiliary storage device 213 includes an HDD (Hard Disk Drive), an SSD (Solid State Device) and so on. The auxiliary storage device 213 stores a program for executing the respective processings described later and data. For example, the auxiliary storage device 213 stores programs for the processor 211 to perform control of the respective portions, as information collecting processing describe later, and data processing. The auxiliary storage device 213 stores operation instruction information, map information, shelf information, article information which will be described later, and collected information, and so on. For example, the processor 211 executes a program which the auxiliary storage device 213 stores, to collect information which the article sensor 15 acquires, with reference to the operation instruction information and the map information.

The communication I/F 214 is a communication unit to communicate with the host apparatus 250. For example, the processor 211 transmits the information collected by the information collecting processing to the host apparatus 250 via the communication I/F 214. In addition, the processor 211 receives the information to be supplied from the host apparatus 250 via the communication I/F 214.

In addition, in the following description of the present embodiment, the system controller 210 will be described as a hardware independent from a cart controller 221 and an arm controller 231 which will be described later. However, the system controller 210 may be realized as one hardware having the function of the cart controller 221 and/or the arm controller 231. In addition, the host apparatus 250 may execute a part of the processing function described later which the system controller 210 executes.

Next, the movement mechanism 220 will be described. The movement mechanism 220 has the cart controller 221, a motor 222, the wheels 12, and a rotary encoder 223, as shown in FIG. 2. The cart controller 221 controls driving of the motor 222. In the present embodiment, the cart controller 221 makes the motor 222 to be driven, in accordance with a control instruction from the system controller 210. The motor 222 drives the wheels 12 attached to the main body 11.

Next, the arm drive mechanism 230 will be described. As shown in FIG. 2, the arm drive mechanism 230 has the arm controller 231, a motor 232, and the link mechanism 30 of the arm 14. The arm controller 231 controls driving of the motor 232. In the present embodiment, the arm controller 231 makes the motor 232 to be driven, in accordance with a control instruction from the system controller 210. The motor 232 drives the link mechanism 30 of the arm 14.

Figure 3:
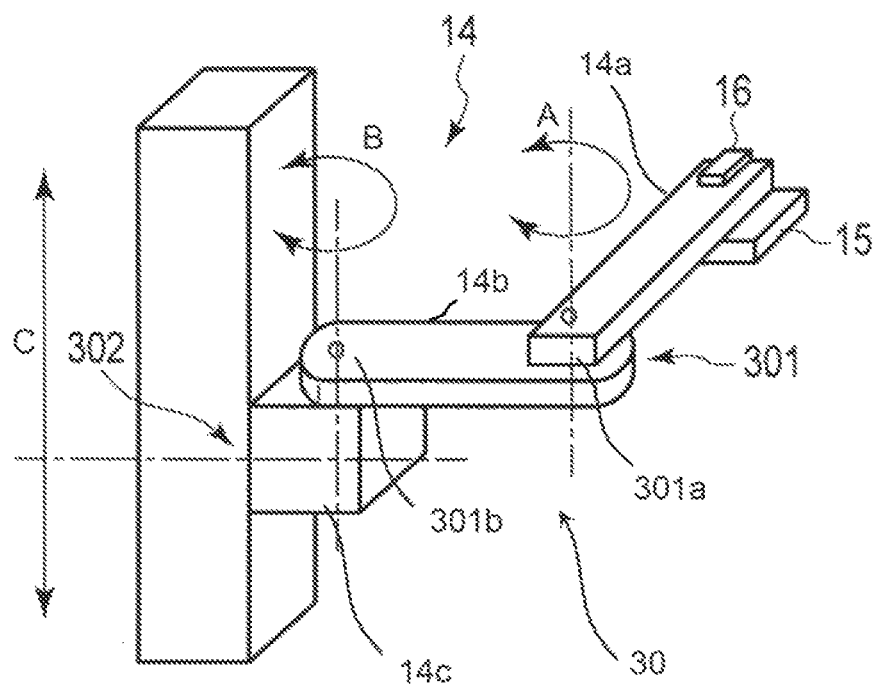
FIG. 3 is a diagram showing the arm in the information collecting apparatus according to the embodiment.

FIG. 3 is a diagram showing a configuration example of the link mechanism 30 of the arm 14. As shown in FIG. 3, the link mechanism 30 includes a horizontal articulated link mechanism (horizontal link mechanism) 301 and the vertical movement mechanism 302. The horizontal link mechanism 301 of the link mechanism 30 has the first joint mechanism 301a and the second joint mechanism 301b. The horizontal link mechanism 301 makes the first arm 14a and the second arm 14b to be rotated respectively by the first joint mechanism 301a and the second joint mechanism 301b (in the direction of the arrow A and in the direction of the arrow B). The horizontal link mechanism 301 makes the first arm 14a and the second arm 14b to be rotated, to make the arm move in the horizontal direction. A tip portion (a free end portion of the first arm 14a) of the first arm 14a which is to be moved by the horizontal link mechanism 301 supports the article sensor 15 and the position sensor 16. For example, the article sensor 15 is supported by the tip portion of the first arm 14a so that lower side of the tip portion of the first arm 14a which is moved by the horizontal link mechanism 301 becomes a measuring position.

The position sensor 16 detects the article M from the tip portion of the arm 14 (the first arm 14a). The position sensor 16 acquires a detection signal for determining a position of a tip of the first arm 14a which is to be moved by the horizontal link mechanism 301. For example, an insert position where the tip of the first arm 14a is inserted inside the shelf 20 is determined based on the detection signal from the position sensor 16. In addition, the judgment that the tip of the first arm 14a is moved to the back of the shelf 20 may be performed based on the detection signal from the position sensor 16. In addition, the position sensor 16 may include a distance sensor for measuring a distance to an object. In this case, the position sensor 16 including the distance sensor may be used as a sensor for measuring a distance to each of the articles M arranged on the shelf boards 201-203 of the shelf 20.

The tip portion of the arm 14 (the first arm 14a) has a shape so that a portion supporting the article sensor 15 can be inserted inside the shelf 20 along the articles M arranged from the front of the shelf 20 to the rear (back) of the shelf 20. In the present embodiment, the tip portion of the first arm 14a supporting the article sensor 15 has a thin shape so that the tip portion can easily be inserted between the articles M arranged on the shelf boards 201-203 of the shelf 20 and the top board 204 or the shelf boards 202, 203 (refer to the shelf board 203 of FIG. 4, for example) above the relevant articles M, respectively. However, the shape of the tip portion of the first arm 14a may be a shape so that the article sensor 15 can be moved inside the shelf 20 along the articles M arranged on the shelf boards 201-203 of the shelf 20, and accordingly the shape thereof is not limited to a thin shape.

In addition, FIG. 3 shows an example in which a horizontal articulated link mechanism is used, as the horizontal link mechanism 301 for moving the tip portion of the arm 14 supporting the article sensor 15 in the horizontal direction. However, the horizontal link mechanism 301 is not limited to a horizontal articulated link mechanism, but a link mechanism of an orthogonal coordinate type or a cylindrical coordinate type may be used. Next, the vertical movement mechanism 302 of the link mechanism 30 will be described. The vertical movement mechanism 302 is provided on the main body 11. The vertical movement mechanism 302 moves the arm support 14c in the direction of an arrow C. The arm support 14c is moved in the direction of the arrow C by the vertical movement mechanism 302, and thereby the arm 14 moves in the vertical direction.

Next, the article sensor 15 will be described. Information which the information collecting apparatus 1 collects is information indicating a state of each of the articles M arranged on the shelf boards 201-203 of the shelf 20. For example, the information which the information collecting apparatus 1 collects is information such as a shape of the article M, a kind of the article M, an arrangement of the article M, the number of the articles M, a temperature of the article M, a date of manufacture of the article M, and an expiration date of the article M. The article sensor 15 measures information indicating a state of each of the articles M arranged on the shelf boards 201-203 of the shelf 20 so as to acquire the information indicating these states. The article sensor 15 includes a device in accordance with information to be measured. For example, the article sensor 15 includes an imaging sensor, a distance sensor, a temperature sensor, an RFID (Radio Frequency Identification) reader, and so on. In addition, the article sensor 15 may be a combination of plural types of sensors.

The imaging sensor is a device such as a CCD image sensor or a CMOS image sensor. For example, the imaging sensor may be a camera for taking an image of a photographing area, or a scanner such as a line sensor. The distance sensor is a device for measuring a distance to an object existing in the measurement direction with laser, ultrasonic waves, or the like. The temperature sensor is a device for measuring a temperature of the article M by infrared rays radiated from the article M. The RFID reader is a device for reading information from an RF (Radio Frequency) tag attached to the article M using radio wave. In addition, regarding the RF tag, there is a certain type of RF tag which can read measurement data from a sensor connected to the RF tag and can transmit the measurement data to a RFID reader. The article sensor 15 may be a device which acquires the measurement data read from the RF tag as described above.

Hereinafter, in the present embodiment, the article sensor 15 includes a camera module (hereinafter, simply referred to also as a camera) in which an imaging sensor and an automatic focusing mechanism are combined. However the article sensor 15 is not limited to a camera module, but may be one of various sensors. In addition, the article sensor 15 may be a device in which plural types of sensors are combined, such as a combination of an imaging sensor and a distance sensor.

The article sensor 15 (camera) has a shape movable along the articles M arranged on each of the shelf boards 201-203 of the shelf 20 in the state supported by the arm 14. The article sensor 15 (camera) supported to the arm 14 has a thickness capable of being inserted in a gap between the article M arranged in the shelf 20 and the shelf board 203 (refer to FIG. 4, for example) above the relevant article M. For example, in order to make a shape of the supporting portion of the article sensor 15 in the arm 14 thin, a thin camera used for smartphone and the like can be applied to the article sensor 15. In addition, when performance of the camera used for smartphone and the like is insufficient, a camera for industrial use may be used as the article sensor 15. In addition, an optical system for leading an image of a measuring position (a reading position of the image) to the article sensor 15 (the image sensor of the camera) may be provided on the arm 14.

Figure 4:
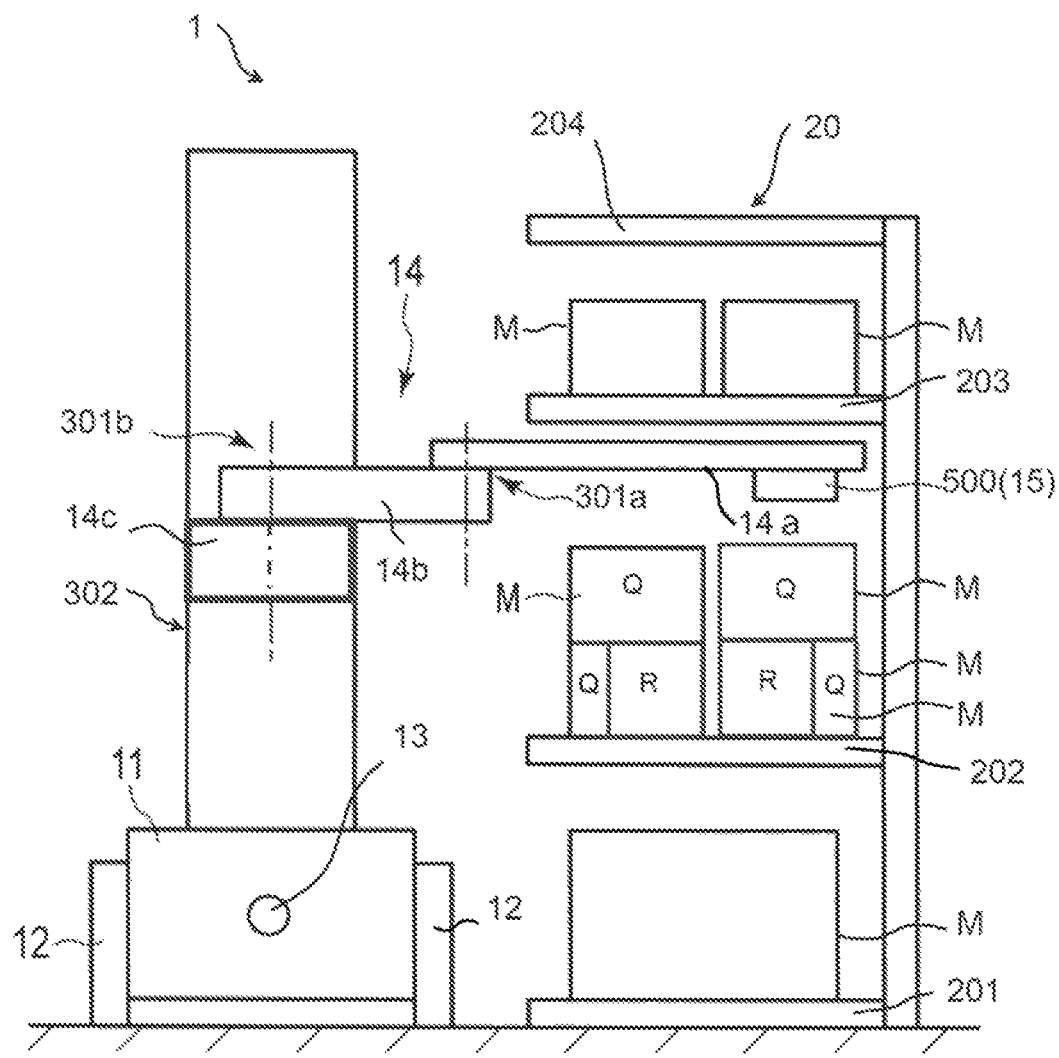
FIG. 4 is a diagram showing an example of the article sensor supported to the arm of the information collecting apparatus according to the embodiment.
Figure 6:
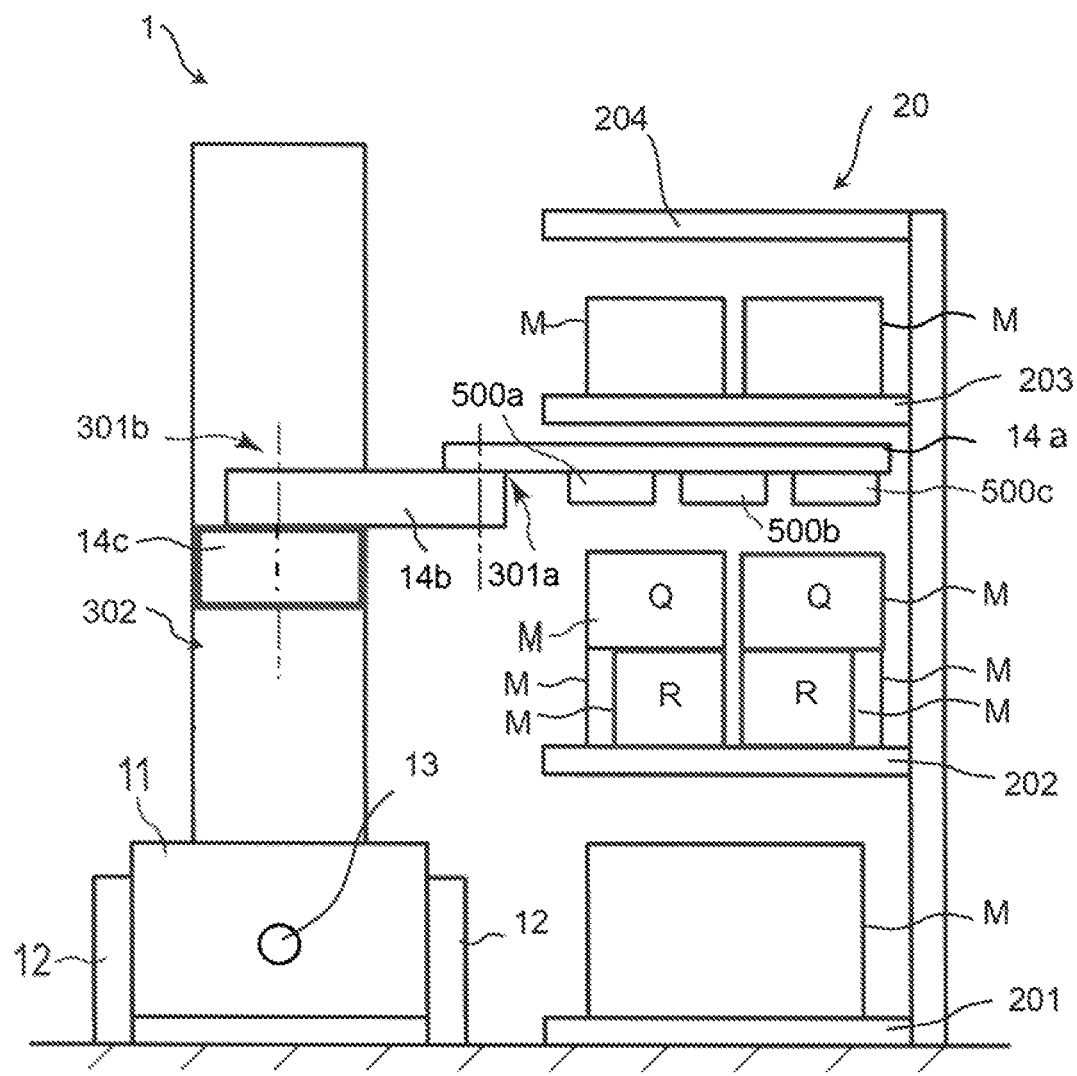
FIG. 6 is a diagram showing an example of the article sensors supported to the arm of the information collecting apparatus according to the embodiment.

FIG. 4 is a diagram showing an example in which a camera 500 is supported near the tip portion of the arm 14, as the article sensor 15. FIG. 6 is a diagram showing an example in which a plurality of cameras 500*a*, 500*b*, 500*c* are supported, as the article sensor 15.

In the example shown in FIG. 4, the article sensor 15 is one camera module 500, and is supported near the tip of the arm 14 (the first arm 14*a*). In the example shown in FIG. 4, a side below the arm 14 (the first arm 14*a*) at the supporting position of the article sensor 15 becomes a photographing position (measuring position) of the article sensor 15. In the state shown in FIG. 4, the tip of the arm 14 (the first arm 14*a*) can move between the article M and the shelf board 203 above the relevant article M in the horizontal direction by the horizontal link mechanism 301 (301*a*, 301*b*). By this means, the article sensor 15 shown in FIG. 4 can take (measure) each of the articles M arranged on the shelf board 202 of the shelf 20 from above the article M.

Figure 5A:
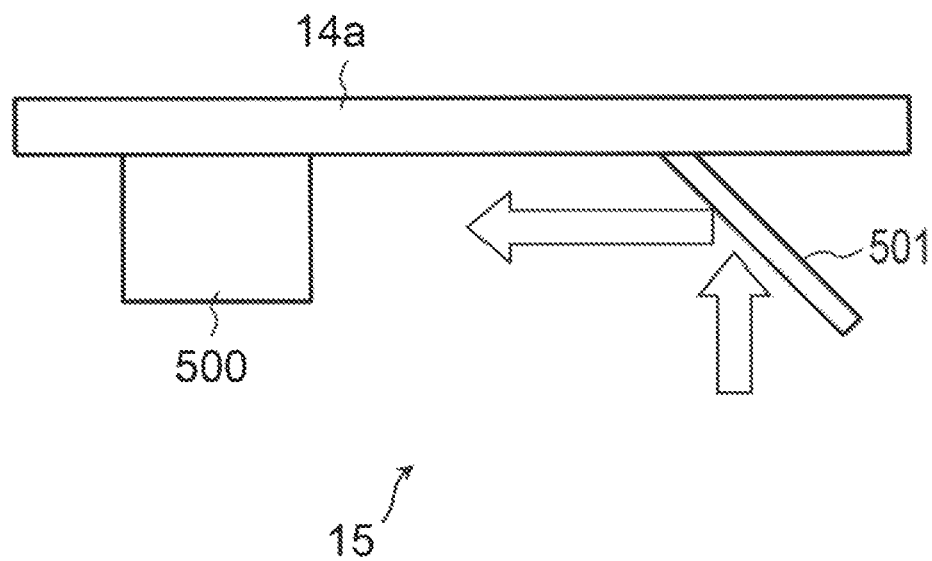
FIG. 5A is a diagram showing an example of the article sensor supported to the arm of the information collecting apparatus according to the embodiment.
Figure 5B:
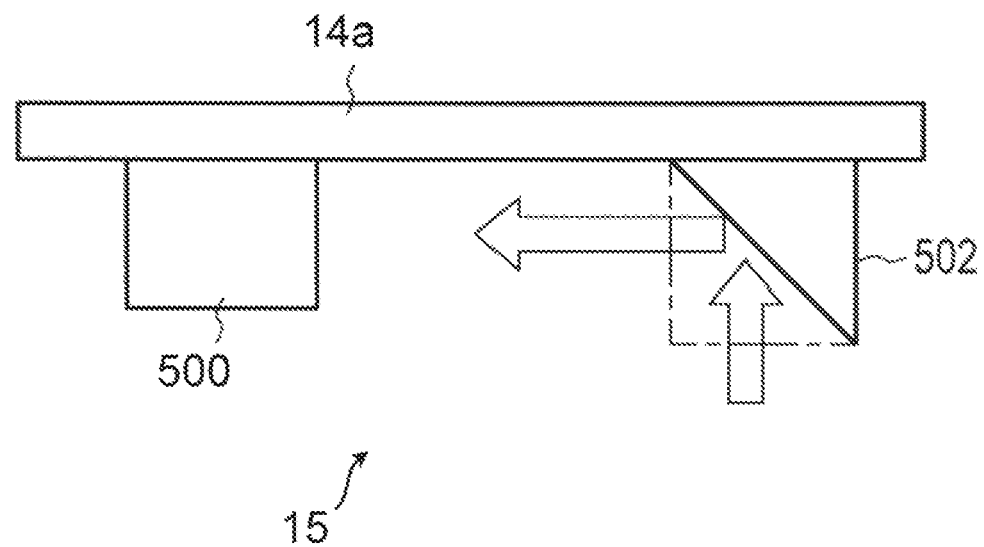
FIG. 5B is a diagram showing an example of the article sensor supported to the arm of the information collecting apparatus according to the embodiment.

In addition, in examples of FIG. 5A and FIG. 5B, the article sensors 15 include the cameras 500 and mirrors 501, 502 as optical systems, respectively. FIG. 5A shows an example in which the mirror 501 is supported near the tip of the arm (the first arm 14*a*) as an optical system for optically leading an image of the article M to the camera 500. In addition, FIG. 5B shows an example in which the prism 502 is supported near the tip of the arm 14 as an optical system for optically leading an image of the article M to the article sensor 15. In each of the examples shown in FIG. 5A, FIG. 5B, an area below the vicinity of the tip of the arm 14 (the first arm 14*a*) supporting each of the optical systems 501, 502 becomes a photographing position (measuring position) of the camera 500. Even in the examples shown in FIG. 5A, FIG. 5B, the tip of the arm 14 is moved between the article M and the shelf board 203 above the relevant article M, and thereby each of the articles M arranged on the shelf board 202 of the shelf 20 can be taken (measured) from above the article M.

In addition, FIG. 6 shows the example in which a plurality of the cameras 500*a*, 500*b*, 500*c* are supported to the arm 14 (the first arm 14*a*), as the article sensor 15. In the example shown in FIG. 6, areas below the arm 14 to which the respective cameras 500*a*, 500*b*, 500C are supported become photographing positions (measuring positions) of the respective cameras 500*a*-500*c*. In the example shown in FIG. 6, the arm 14 is inserted between the articles M and the shelf board 203 above the relevant articles M, and thereby the plurality of cameras can take (measure) images of the respective measuring positions. That is, according to the example shown in FIG. 6, images of the articles M in a wide range can be taken by the plurality of cameras 500*a*-500*c*. Even when a field of view for one camera is small, according to the example shown in FIG. 6, images of the articles M in a wide range from the front of the shelf 20 to the back thereof which is set as the photographing positions (measuring positions) can easily be taken.

Figure 7:
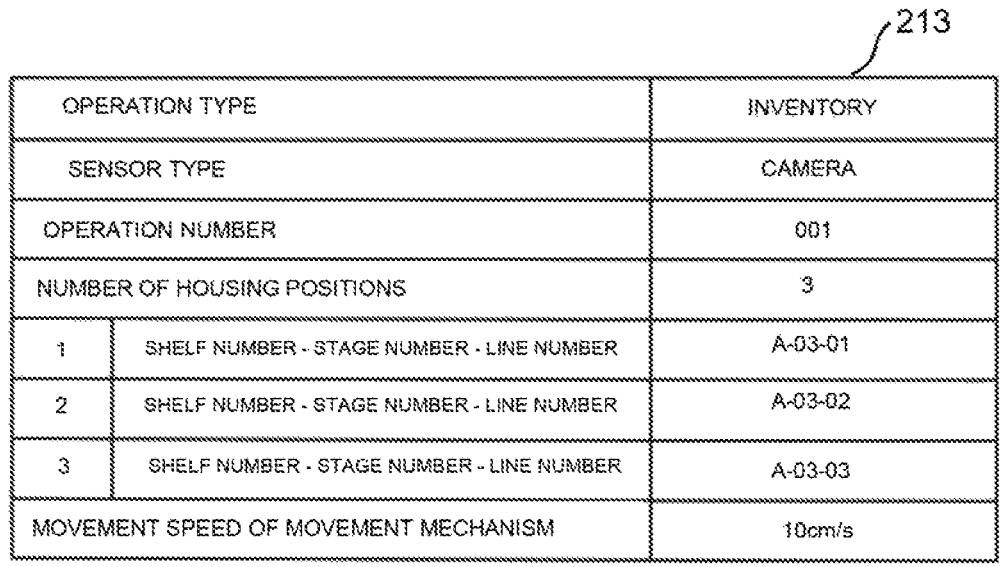
FIG. 7 is a diagram showing an example of operation instruction information for instructing an operation to the information collecting apparatus according to the embodiment.

The information collecting apparatus 1 performs processing (information collecting processing) for collecting information indicating states of the articles M arranged on the shelf boards 201-203 of the shelf 20. Hereinafter, various information to be used in the information collecting processing will be described. FIG. 7 and FIG. 8 show example of operation instruction information which contain procedure of the above-described information collecting processing. The operation instruction information is stored in the auxiliary storage device 213, for example. In the system controller 210, the processor 211 controls an operation for performing the information collecting processing, in accordance with the operation instruction information which the auxiliary storage device 213 stores. The operation instruction information may be supplied from the host apparatus 250.

In the examples shown in FIG. 7 and FIG. 8, the operation instruction information includes information such as operation type information, sensor type information, an operation ID (Identification Data), the number of storage positions, a storage position ID, and a movement speed. That is, the auxiliary storage device 213 stores the information such as the operation type information, the sensor type information, the operation ID, the number of storage positions, the storage position ID, and the movement speed, as the operation instruction information. The operation type information is information indicating operation type. In the examples shown in FIG. 7 and FIG. 8, an operation type "inventory" indicates counting the number of the items M at each of designated storage positions, as the operation type information in the auxiliary storage device 213. In addition, the operation type is not limited to counting the number of the items M. For example, the operation type may include collection of measurement data (an image, for example) by the item sensor 15 at the storage position designated by the storage position ID. In addition, the operation type may include expiration date check or temperature check of the article M at the designated storage position.

The sensor type information is information such as a sensor type indicating a sensor to be used for performing the operation. In the examples shown in FIG. 7 and FIG. 8, "camera" is stored in the auxiliary storage device 213 as the sensor type. In addition, when plural number of the sensors (the cameras 500*a*-500*c*) are supported to the arm 14 as the article sensor 15 as shown in FIG. 6, for example, a sensor to be used can be designated in the above-described sensor type of the operation instruction information. In addition, as the sensor type of the operation instruction information, plural types of sensors may be designated. For example, a camera and a distance sensor may be designated as the sensor type.

The operation ID information is a management number for managing a plurality of operations designated by the operation instruction information. Regarding the operation ID, a unique number is assigned to each operation (each operation instruction information). The number of storage positions includes the number of storage positions (the number of places) at which the operation is instructed by the one operation instruction information that is specified by the operation ID. In the example shown in FIG. 7, for example, "3" is stored in the auxiliary storage device 213 as the number of storage positions. That is, the operations at the three storage positions are instructed. The movement speed includes a movement speed of the main body 11 by the movement mechanism 220 in the operation instructed by the relevant operation instruction information. The movement speed is designated in accordance with the kind of the article M to be measured, or the type of the sensor to be used as the article sensor 15, for example.

The storage position ID is information indicating a position (a storage position in the shelf 20) where to perform an operation. The storage position ID is information which is associated with a position in each of the shelf boards 201-203 of the shelf 20 in shelf information described later, for example. One operation instruction information can designate one or a plurality of storage position IDs indicating one or the plurality of storage positions where to perform an operation. For example, in the example shown in FIG. 7, in accordance with the number of storage positions "3", position information (combination information of a shelf number, a stage number, and a line number) of three places is stored in the auxiliary storage device 213. In the example shown in FIG. 7, an example is shown in which a plurality of storage position IDs indicating the plurality of lines in the same shelf number "A" and the same stage number "03" are designated in one operation instruction information. In addition, in the example shown in FIG. 8, an example is shown in which a plurality of storage position IDs indicating a plurality of lines in a plurality of stages (stage numbers "01", "02", "03") of the same shelf number "B" are designated in one operation instruction information.

Next, map information which is referred to when the main body 11 of the information collecting apparatus 1 moves will be described. The map information is stored in the auxiliary storage device 213, for example. In the system controller 210, the processor 211 plans a route in which the main body 11 moves with reference to the map information which the auxiliary storage device 213 stores. That is, when executing the operation in accordance with the operation instruction information, the processor 211 determines a movement route of the main body 11 with reference to the map information. The map information includes information indicating free space, prohibited area, position of obstacle and so on in a movement range of the information collecting apparatus 1.

Next, the shelf information indicating the storage position and so on of the article M in the shelf 20 where to perform an operation of the information collecting apparatus 1 will be described. FIG. 9 conceptually shows the auxiliary storage device 213 which stores the shelf information. In the example shown in FIG. 9, the shelf information includes information such as a storage position ID, a starting position, a direction, a depth, and a width of the line. The storage position ID is information for specifying a housing place of the article M. In the example shown in FIG. 9, the storage position ID includes the shelf number, the stage number, the line number, as described above. The shelf number is information for specifying the shelf 20. The stage number is information indicating a number of the stage for specifying the shelf boards 201-203 in the shelf 20. The stage number "1" shows the shelf board 201 at the first stage in FIG. 10, for example. The stage number "2" shows the shelf board 202 at the second stage in FIG. 10, for example. The stage number "3" shows the shelf board 203 at the third stage in FIG. 10, for example. The line number is information indicating a line in each of the shelf boards 201-203 of the respective stages. The line number "1" shows a first line in each of the shelf boards 201-203 in FIG. 10, for example. The line number "2" shows a second line in each of the shelf boards 201-203 in FIG. 10, for example. The line number "3" shows a third line in each of the shelf boards 201-203 in FIG. 10, for example.

Figure 10:
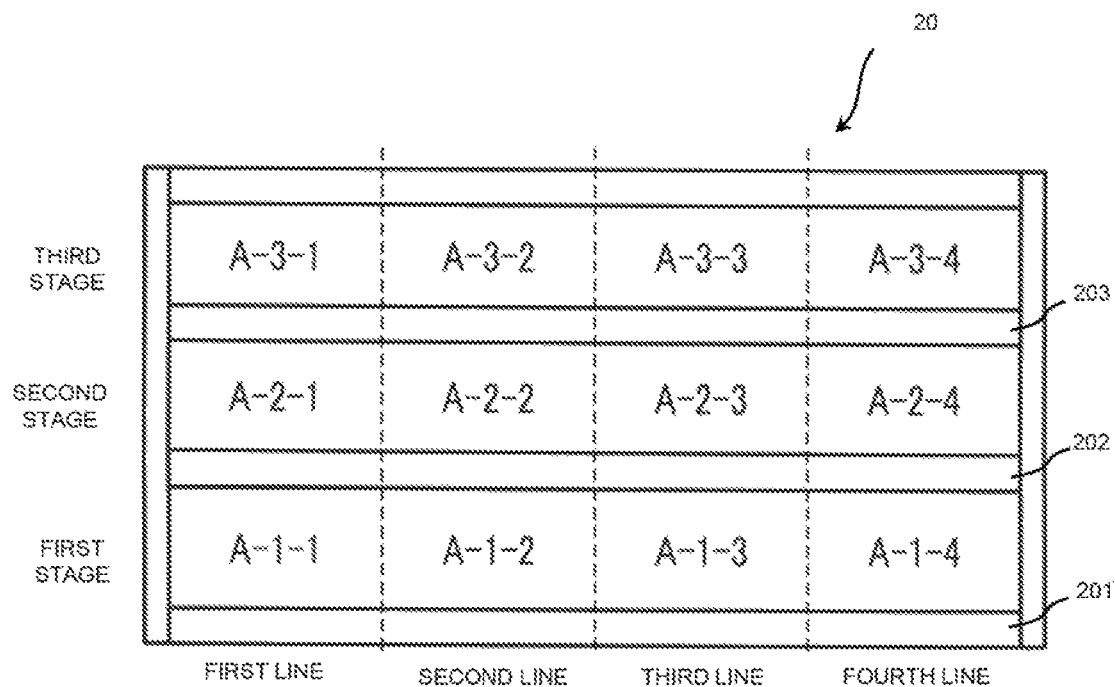
FIG. 10 is a diagram showing a configuration example of a storage position ID for the information collecting apparatus according to the embodiment to specify a storage position in the shelf.

FIG. 10 is a diagram showing an example of storage position IDs in the shelf 20. Specifically, FIG. 10 shows an example of storage position IDs for respective storage positions in a state in which the shelf 20 of the shelf number "A" is seen from the front. The storage position IDs shown in FIG. 10 are each a number in which a shelf number, a stage number and a line number are lined in order. For example, it is specified that the storage position of the storage position ID "A-1-1" is the shelf board 201 of a first stage (a first stage from the bottom in FIG. 10) in the shelf 20 of the shelf number "A", and a first line (a first line from the left in FIG. 10) in the shelf board 201.

In the example shown in FIG. 9, information of the starting position is information indicating a position (a starting position of a measuring operation) at which the article sensor 15 starts measurement, for the storage position specified by the storage position ID. In the example shown in FIG. 9, the starting position is indicated by xy-coordinates (an x-coordinate and a y-coordinate) indicating a position on the horizontal plane, and a z-coordinate indicating a height of the article sensor 15 from the ground surface.

Figure 11:
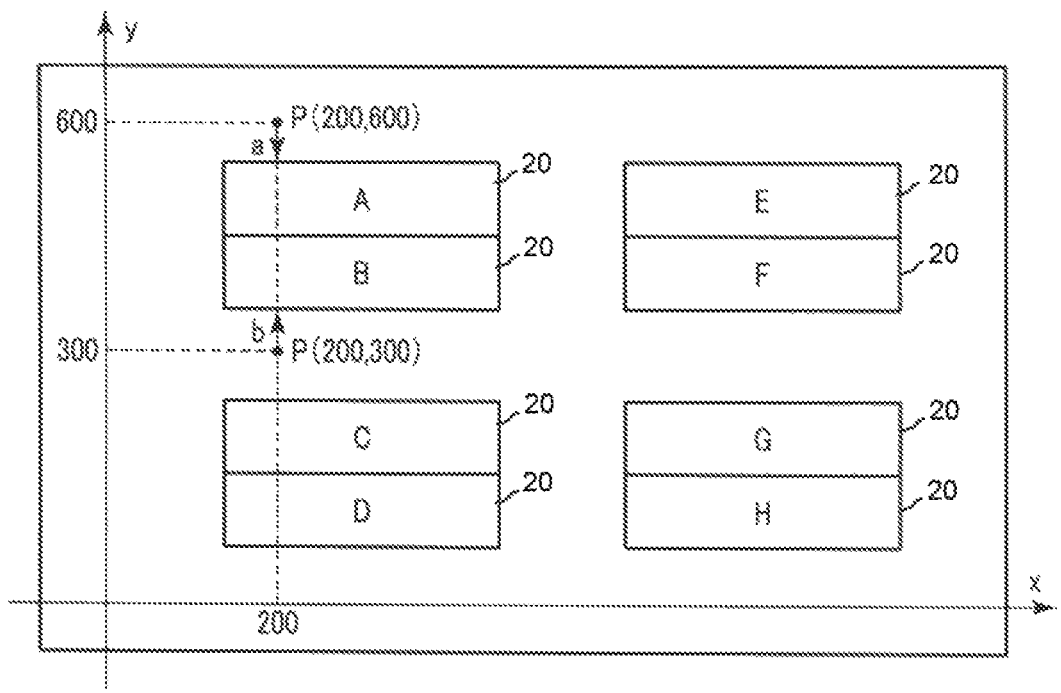
FIG. 11 is a diagram showing xy-coordinates and an arrangement example of the shelves in a movement range of the information collecting apparatus according to the embodiment.

FIG. 11 is a diagram showing xy-coordinates indicating the position in the movement range of the information collecting apparatus 1 and an arrangement example of a plurality of the shelves 20 in each of which the articles M are to be stored. The movement range shown in FIG. 11 is specified by the map information, for example. Each position in the movement range shown in FIG. 11 is indicated by the xy-coordinates. For example, a position P (200, 600) shown in FIG. 11 is a position which the xy-coordinates of the starting position for the storage position of the storage position ID "A-1-1" shown in FIG. 9 indicate.

In the example shown in FIG. 9, the information of the direction is information indicating a direction (a direction regard as a front surface of the shelf 20) in which the surface of the shelf 20 faces on the map which the map information indicates. In the example shown in FIG. 11, there exist a plurality of the shelves 20 to which A-H are set as the shelf numbers. Regarding the shelf 20 of the shelf number A, a surface which is seen from the position P (200, 600) in the direction shown by an arrow a is a front surface, for example. In contrast, regarding the shelf 20 of the shelf number B, a surface which is seen from the position P (200, 300) in the direction shown by an arrow b is a front surface. In the example shown in FIG. 9, the information of the depth is information indicating a length (a depth of the shelf 20) of each of the shelf boards 201-203 from the front (the front surface) to the back (the rear surface) in the shelf 20. In the example shown in FIG. 9, the information of the width of the line is information indicating a part of horizontal length of each of the shelf boards 201-203 where is designated by the shelf number, the stage number and the line number (the storage position ID).

Next, the article information will be described. FIG. 12 conceptually shows the auxiliary storage device 213 which stores the article information. The article information is information relating to the article M to be monitored. In the example shown in FIG. 12, the article information includes an article number, feature information, size (length, width, height) information, and a storage position ID. The article number is an identification number for managing the article M. The article number is given for each SKU (minimum management unit), for example. The size (length, width, height) information is information indicating a size of the article M. The storage position information is information indicating a position at which the article M is to be stored.

The feature information includes information indicating a shape of the article M and information such as a feature point which will become necessary in an image processing. The feature information is information for specifying the article M based on the information which the article sensor 15 measures. In addition, the feature information is information which will become necessary for counting the number of the articles M. As the feature information, information in accordance with the type of a sensor to be used as the article sensor 15 is used. In the present embodiment, it is supposed that the article sensor 15 is a camera. For this reason, in the present embodiment, the feature information is selected as information for referring to feature data registered in a feature database not shown for feature correlation for specifying the article M (refer to the feature database.)

Figure 13:
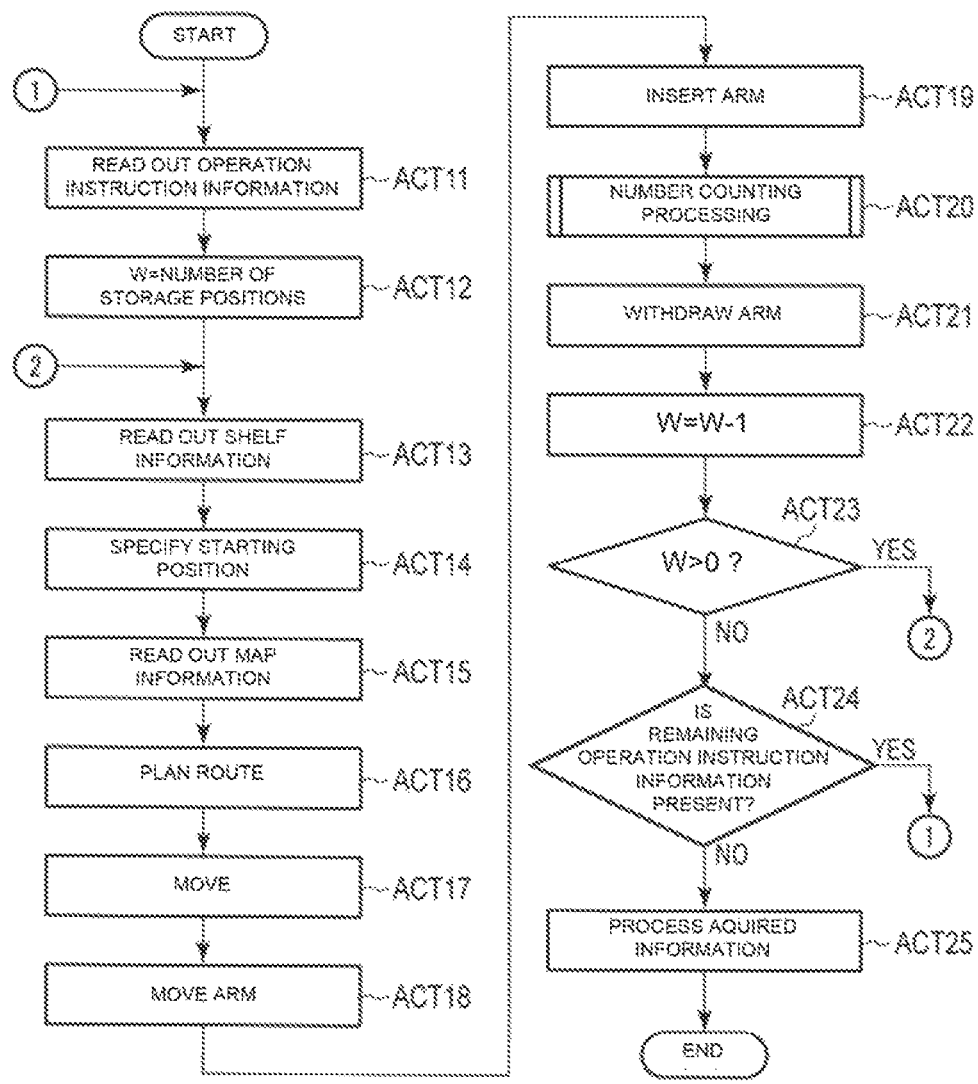
FIG. 13 is a flow chart showing an operation example of an inventory operation in the information collecting apparatus according to the embodiment.

Next, an information collecting processing in the information collecting apparatus according to the present embodiment will be described. FIG. 13 is a flow chart showing an inventory processing (operation) as an example of an information collecting processing in the information collecting apparatus according to the present embodiment. The processor 211 of the system controller 210 receives an operation start instructed form the host apparatus 250 or by an operation of a user interface not shown. When having received the instruction of the above-described operation start, the processor 211 starts an information collecting processing shown in FIG. 13. In ACT11 of FIG. 13, the processor 211 of the system controller 210 reads out the operation instruction information (refer to FIG. 7 and FIG. 8) stored by the auxiliary storage device 213 from the auxiliary storage device 213. Here, the operation type to be executed is decided as an inventory operation. For this reason, the processor 211 reads out one operation instruction information in which operation type t is inventory from the auxiliary storage device 213.

When the processor 211 reads out the one operation instruction information, the processing of the processor 211 transfers to ACT12. In ACT12, the processor 211 sets the number of the storage positions (the total number of the storage positions) in the read-out operation instruction information as an initial value of a variable "W" indicating "the number of the remaining storage positions". When the processor 211 sets the total number of the storage positions as the initial value of the variable W, the processing of the processor 211 transfers to ACT13. In ACT13, the processor 211 reads out the shelf information (refer to FIG. 9) stored in the auxiliary storage device 213 from the auxiliary storage device 213. In ACT14, the processor 211 specifies a starting position for a first storage position (a storage position where to perform an operation) with reference to the above-described shelf information. For example, the processor 211 specifies the storage position ID (refer to the shelf number-stage number-line number of FIG. 7, for example) indicating the storage position where to perform an operation from the operation instruction information. Having specified the storage position ID, the processor 211 specifies the coordinates of the starting position corresponding to the storage position ID based on the shelf information (refer to FIG. 9).

When the processor 211 has specified the above-described starting position, the processing of the processor 211 transfers to ACT15. In ACT15, the processor 211 reads out the map information stored in the auxiliary storage device 213 from the auxiliary storage device 213. In ACT16, the processor 211 plans a route for moving from the present position to the starting position with reference to the map information. When the processor 211 has planned the above-described route, the processing of the processor 211 transfers to ACT17. In ACT17, the processor 211 instructs information indicating the above-described planned route and the movement speed designated by the operation instruction information to the movement mechanism 220, to make the main body 11 move.

That is, in ACT17, the cart controller 221 of the movement mechanism 220 makes the motor 222 for travelling to be driven, in accordance with the instruction from the system controller 210, to make the main body 11 of the information collecting apparatus 1 move from the present position to the above-described starting position. In addition, after having made the motor 222 for traveling to be driven, the cart controller 221 measures a rotation count of the wheels 12 using the rotary encoder 223 of the movement mechanism 220. The cart controller 221 periodically notifies the processor 211 of the system controller 210 of information indicating the rotation amount of the wheels 12 to be measured by the rotary encoder 223. The processor 211 of the system controller 210 calculates a movement amount (distance) of the main body 11, based on the rotation amount of the wheels 12 and the measurement data of the obstacle sensor 13. The processor 211 updates the coordinates indicating the position of the main body 11 in the travel environment (movement range) as needed. The processor 211 compares the position of the main body 11 to be updated as needed with the route plan, and determines the drive instruction content such as the movement speed to be instructed to the movement mechanism 220. The processor 211 instructs the determined drive instruction content to the movement mechanism 220, in accordance with the updated position of the main body 11.

When the position of the main body 11 reaches the starting position, the processor 211 supplies a drive instruction to the movement mechanism 220 so that the direction of the shelf 20 (the direction of the front surface of the shelf 20) which is designated by the shelf information (refer to FIG. 9) directly faces the moving direction of the tip of the arm 14 (the moving direction of the measurement position). By this means, the main body 11 of the information collecting apparatus 1 becomes in a state facing a direction orthogonal to the front direction of the shelf 20 at the starting position (refer to FIG. 1).

When the main body 11 reaches the position (the starting position) that is in a state opposite to the storage position where to perform an operation in the shelf 20, the processing of the processor 211 transfers to ACT18. In ACT18, the processor 211 makes the tip portion of the arm 14 supporting the article sensor 15 move to the height designated by the starting position. For example, the processor 211 supplies an operation instruction to the arm drive mechanism 230 so that the tip of the arm 14 reaches the height (the z-coordinate) of the starting position to be designated by the operation instruction information.

When the tip of the arm 14 reaches the height of the starting position, the processing of the processor 211 transfers to ACT19. In ACT19, the processor 211 inserts the tip of the arm 14 into the shelf 20 so that the article sensor 15 can measure states of the articles M in the whole storage position (refer to FIG. 4, for example). The processor 211 controls the arm drive mechanism 230 so that the tip of the arm 14 supporting the article sensor 15 can be inserted between the articles M arranged at the relevant storage position and the shelf board 203 (refer to FIG. 4, for example) above the relevant articles M. For example, the processor 211 determines a position to which the tip of the arm 14 is inserted inside the shelf 20, in accordance with the depth of the shelf 20 which the shelf information (refer to FIG. 9) indicates, and controls driving of the arm drive mechanism 230. In addition, the processor 211 controls the movement of the arm 14 via the arm drive mechanism 230, so that the article sensor 15 and the arm 14 do not collide with the shelf board 203 and the articles M, in accordance with the measurement result of the position sensor 16.

When the tip of the arm 14 supporting the article sensor is inserted inside the shelf 20, the processing of the processor 211 transfers to ACT20. In ACT20, the processor 211 executes a number counting processing of the articles M for the relevant storage position. The number counting processing is a processing of counting the number of the articles M actually existing at the relevant storage position, based on the information which the article sensor 15 measures. The number counting processing will be described later in detail.

When the number counting processing for the relevant storage position is finished, the processing of the processor 211 transfers to ACT21. In ACT21, the processor 221 withdraws the tip of the arm 14 supporting the article sensor 15 from the inside of the shelf 20. For example, the processor 211 instructs the arm drive mechanism 230 so as to withdraw the tip of the arm 14 from the shelf 20 and move the arm 14 to the prescribed home position. When the tip of the arm 14 is withdrawn from the shelf 20, the processing of the processor 211 transfers to ACT22. In ACT22, the processor 211 subtracts 1 from the variable "W" indicating the number of the remaining storage positions (W=W−1). When the processor 211 performs subtraction of the variable W, the processing of the processor 211 transfers to ACT23. In ACT23, the processor 211 judges whether the variable W (the number of the remaining storage positions) is larger than 0. When the variable W is larger than 0, that is, when the storage position where the operation has not been completed exists in the present operation instruction information (ACT23, YES), the processing of the processor 211 returns to ACT13. The processor 211 executes the above-described ACT13-ACT23 for the next storage position to be designated by the present operation instruction information.

In addition, when the variable W is 0, that is, when the operations for the whole storage positions to be designated by the present operation instruction information have been completed (ACT23, NO), the processing of the processor 211 transfers to ACT24. In ACT24, the processor 211 judges whether the remaining operation instruction information in which the operation has not been performed is present. When the remaining operation instruction information is present (ACT24, YES), the processing of the processor 211 returns to the above-described ACT11. In the above-described ACT11, the processor 211 executes the above-described processing for the next operation instruction information.

When the processor 211 judges that the remaining operation instruction information is not present (ACT24, NO), the processing of the processor 211 transfers to ACT25. In ACT25, the processor 211 executes information processing for the collected information. Here, since the operation type is the inventory operation, the processor 211 executes information processing as the inventory operation based on the collected information (read numbers of the respective articles M). In addition, the processor 211 may transmit the collected information to the host apparatus 250, and the host apparatus 250 may execute the information processing for the collected information.

For example, the processor 211 reads out information indicating theoretical stock numbers which are previously stored in the auxiliary storage device 213 from the auxiliary storage device 213. The processor 211 calculates a difference between the actually counted number (read number) and the above-described theoretical stock number for each kind of the articles M. The information indicating the theoretical stock numbers may be stored in a storage device other than the auxiliary storage device 213, or may be acquired from the host apparatus 250. When having calculated the difference between the read numbers and the theoretical stock numbers, the processor 211 creates information indicating an inventory result including the read number, the theoretical stock number, and the above-described calculated difference, for each kind of the articles M. When having created the information indicating the inventory result, the processor 211 stores the information indicating the above-described created inventory result in the auxiliary storage device 213. In addition, the processor 211 may transmit the information indicating the above-described created inventory result to the host apparatus 250.

FIG. 14 conceptually shows the auxiliary storage device 213 which stores the information indicating the inventory result (the result of totalizing the collected information). In the example shown in FIG. 14, the information indicating the inventory result includes information such as an article number, a theoretical stock number, a read number and a difference. The article number is information indicating the article M which is set as an object of inventory operation. The theoretical stock number is a stock number of the articles M on the book which is managed by stock management. The read number is the number of the articles M counted by the above-described processing, that is, based on the measurement result of the article sensor 15. The difference is a number obtained by subtracting the read number from the theoretical stock number, as described above.

According to the processing as described above, the information collecting apparatus 1 makes the arm 14 supporting the article sensor 15 move inside the shelf 20, and measures states of the articles M arranged at the respective storage positions inside the shelf 20 by the article sensor 15. According to the information collecting apparatus 1 like this, the article sensor 15 is inserted inside the shelf 20, and thereby it is possible to surely measure states of, not only the articles M arranged at the front side (the front surface side) of the shelf 20, but also a plurality of the articles M in the whole respective storage positions of the shelf 20.

In addition, the information collecting apparatus measures states of the articles M arranged at the respective storage positions (refer to the shelf number-stage number-line number in FIG. 7 and FIG. 8) designated by the operation instruction information (refer to FIG. 7 and FIG. 8) by the article sensor 15 in order, and collects information indicating the states of the articles M arranged on the shelf boards 201-203 of the shelf 20. Further, the information collecting apparatus performs information processing such as counting of the number of the articles M and the inventory operation based on the collected information. According to the information collecting apparatus like this, it is possible to surely measure the states of the respective articles M arranged on the shelf boards 201-203 of the shelf 20, and accordingly, it is possible to accurately perform the information processing such as the counting of the number of the articles M and the inventory operation.

Figure 15:
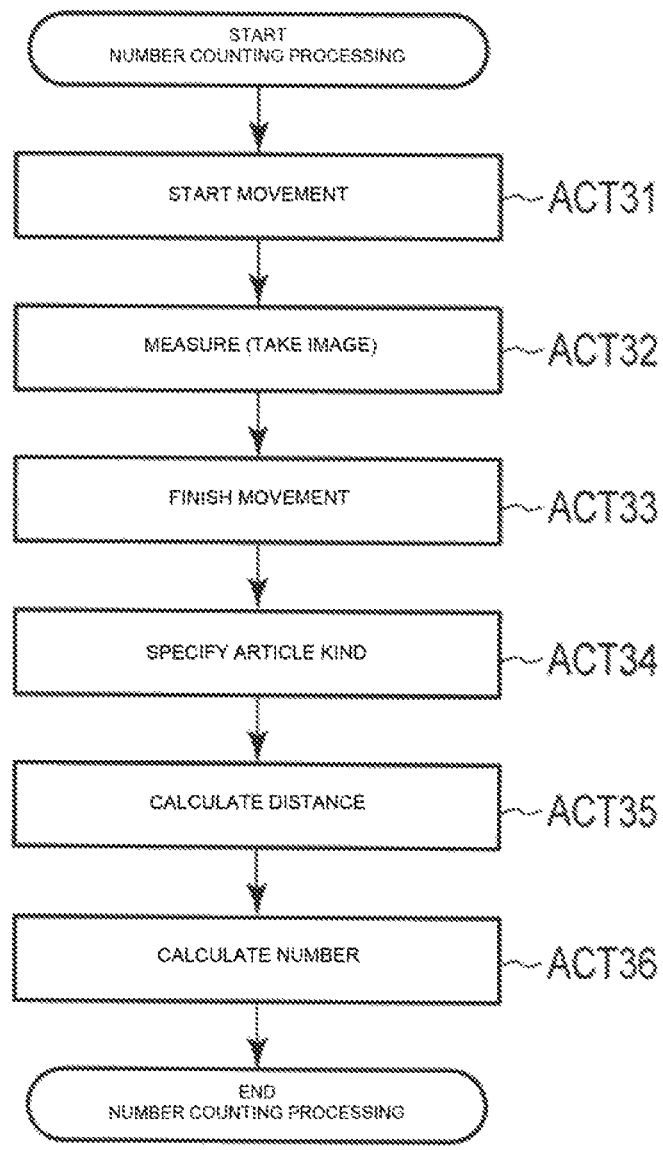
FIG. 15 is a flow chart showing an operation example of a number counting operation in the information collecting apparatus according to the embodiment.

Next, a number counting processing in the information collecting apparatus 1 will be described. FIG. 15 is a flow chart showing an operation example of a number counting processing in the information collecting apparatus 1. As shown in FIG. 15, in ACT31, the processor 211 of the system controller 210 inserts the tip of the arm 14 into the shelf 20, and then starts a movement control so that the article sensor 15 can measure the whole storage position. For example, the processor 211 makes the main body 11 move by the movement mechanism 220, at the movement speed designated by the operation instruction information (refer to FIG. 7 and FIG. 8), and by a length of the width (a width of the line) of the relevant storage position which the shelf information (refer to FIG. 9) indicates. In ACT32, the processor 211 performs measurement by the article sensor 15, while making the main body 11 move by the movement mechanism 220.

That is, the tip of the arm 14 inserted inside the shelf 20 also moves, in accordance with the movement of the main body 11. For the reason, the article sensor 15 supported at the tip of the arm 14 measures states of the articles M in an area of the whole storage position by the movement of the main body 11. In ACT33, when the main body 11 moves by a distance in accordance with the width of the relevant storage position, the processor 211 stops the movement of the main body 11. When having stopped the movement of the main body 11, the processor 211 finishes the measurement for the relevant storage position by the article sensor 15.

For example, when the article sensor 15 includes a camera, the article sensor 15 takes an image of the whole storage position, along with the movement of the main body 11 by the movement mechanism 220, in accordance with the width of the storage position (a width of the line). In the configurations shown in FIG. 3 to FIG. 5, (the camera) as the article sensor takes the storage position at which the article M is arranged from above the article M. In this case, the processor 211 acquires a taken image obtained by taking the whole storage position from above the article M by (the camera) as the article sensor 15.

When the processor 211 acquires the measurement data (taken image) for the storage position, the processing of the processor 211 transfers to ACT34. In ACT34, the processor 211 specifies a kind of the article M which is actually arranged, based on the taken image as the measurement data. For example, the processor 211 compares the image photographed by the article sensor 15 (camera) with the feature amount stated in the article information, to specify a kind of the article M included in the taken image.

In addition, in ACT35, the processor 211 calculates a distance from the article sensor 15 to the article M, in order to count the articles M which cannot be counted directly from the measurement data (taken image) of the article sensor 15. Regarding a method of calculating a distance to the article M using the taken image by the camera as the article sensor 15, various methods are applicable. For example, when a size of an object on an image for a distance to the object is known, the distance can be obtained using that "when being approached to an object, the object in image is large, and when leaving from the object, the object in image is small". In addition, there is a method for obtaining a distance utilizing deviation of left and right images using two or more cameras. Further, when a distance sensor is provided in addition to the camera as the article sensor 15, a distance to the article M may be obtained by a measurement value which the distance sensor measures.

After the processor 211 has obtained the kind of the article M and the distance from the article sensor 15 to the object, the processing of the processor 211 transfers to ACT36. In ACT36, the processor 211 calculates the number of the articles M existing at the storage position. For example, the processor 211 extracts images of the articles M from the taken image, and determines the number of the articles M in accordance with the distances to the respective articles M extracted as the images. Specifically, the processor 211 groups the images of the articles M extracted from the taken image, and counts the number of the articles M in order from the groups near to the article sensor 15 (camera). That is, the processor 211 counts the number of the articles M of the first nearest (the nearest) groups. Next, when counting the number of the articles M of the second nearest or succeeding groups, the processor 211 adds the number of the articles M which have been previously counted to the number of the articles M appearing in the taken image.

Figure 16:
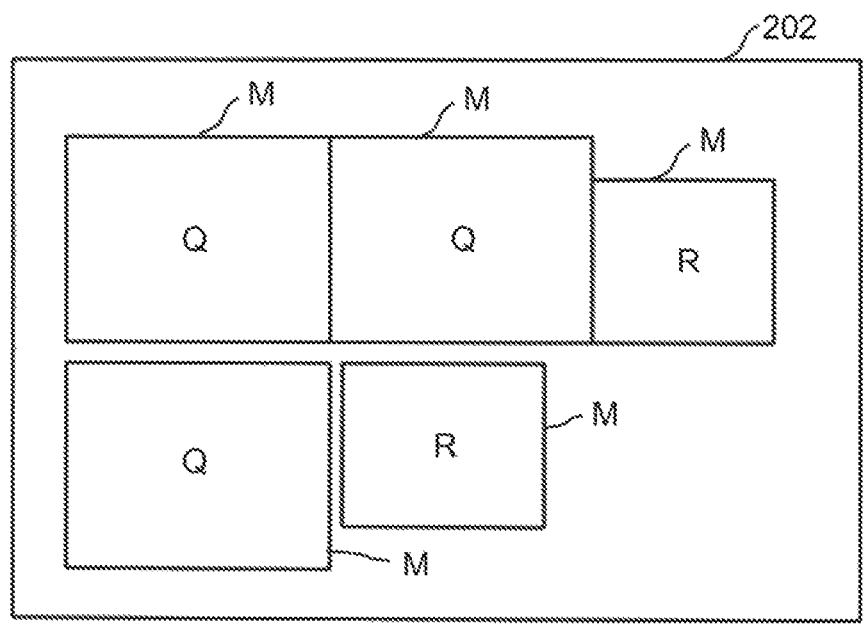
FIG. 16 is a diagram showing an example of a taken image which the information collecting apparatus according to the embodiment makes an object of number counting.

For example, FIG. 16 is a diagram showing an example in which article images extracted from the taken image of the article sensor 15 (camera) are grouped. The above-described taken image of the article sensor 15 (camera) is an image taken from above the articles M arranged on the shelf board 202 (refer to FIG. 4 or FIG. 6), for example. The example shown in FIG. 16 shows a state in which the article images extracted from the taken image are grouped into two groups of Q, R. When the taken image shown in FIG. 16 is obtained, the processor 211 determines that the first nearest (the nearest) group from the article sensor 15 is the Q group, for example. The processor 211 counts that the number of the articles M included in the Q groups is three, based on the taken image. Next, the processor 211 determines the R group as the second nearest group (nearest next to the Q group) from the article sensor 15. The processor 211 counts that the number of the articles M included in the R groups is two that is the number of the articles M appearing in the taken image. Further, in this case, the processor 211 adds the number of the articles M which have been previously counted (the number of the articles M of the Q groups in this case) that is three, to the number of the articles M of the R groups appearing in the taken image that is two, and thereby obtains five as the total number of the articles M of the R groups and the articles M which are concealed from the articles M of the Q groups and do not appear in the taken image. And finally, the processor 211 adds the number of the articles M of the Q groups and the R groups to the number of the articles M of the Q groups that is three, and thereby determines that the total number of the whole articles M arranged on the shelf board 202 is eight. The above-described method is a method for counting the total number assuming that the articles M of the same number (in this case, three) as the articles M in overlapping state (the articles of the Q groups appearing in the taken image) exist at the portions which do not appear in the taken image.

In addition, the calculation of the distance is a processing for counting the number of the articles M which are overlappedly arranged. For the reason, when the number of the articles M can be counted without determining the number thereof based on the distance, the processing of calculating the distance may be omitted. For example, when an RFID reader is used as the article sensor 15, even when the articles M are overlapped, it is possible to identify RF tags pasted on the respective articles M. In this case, the processor 211 can identify the articles M and count the number thereof by information which the RFID reader reads from the RF tags.

The number counting processing as described above is executed for each storage position where to perform an operation. By this means, the information collecting apparatus 1 can count the number of the articles M that are actually arranged from the measurement data of the article sensor 15 for each storage position.

As described above, the information collecting apparatus according to the present embodiment has the arm 14 supporting the article sensor 15 such as a camera which measures a state of the article M. The information collecting apparatus 1 measures a state of the article M arranged in the shelf 20 by the article sensor 15, in the state in which the arm 14 is inserted inside the shelf 20. By this means, according to the present embodiment, it becomes possible to measure a state of the article M to be arranged at the back of the shelf 20 where the article M is blocked by an article arranged at the front (the front surface side) of the shelf 20 and thereby the measurement thereof is difficult from the front of the shelf 20.

In addition, if the article sensor 15 is a camera, the information collecting apparatus 1 can take the article M arranged in the shelf 20 from the inside of the shelf 20, such as, from above the article M. By this means, according to the information collecting apparatus 1, it is possible to collect an image from which states of the articles M arranged from the front (the front surface side of the shelf 20) toward the back in the shelf 20 can be accurately determined. In addition, the information collecting apparatus 1 performs measurement by the article sensor 15 while moving the arm 14 supporting the article sensor 15 in the state being inserted inside the shelf 20. By this means, according to the information collecting apparatus 1 according to the present embodiment, the measurement by the article sensor 15 can easily be realized, while a wide range such as the whole storage position in the shelf 20 is set as a measurement range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information collecting apparatus which collects information of an article placed on a shelf, comprising:
    an image sensor;
    an arm which supports the image sensor and is movable in both horizontal and vertical directions;
    an arm drive mechanism configured to move the arm; and
    a processor configured to
        upon receipt of an instruction to acquire information about an article, determine a location on a shelf on which the article is placed based on an entry in a database, and determine a position for the arm to be moved based on the determined location,
        control the arm drive mechanism to horizontally and vertically move the arm to the determined position, and
        when the arm is positioned at the determined position, control the image sensor to acquire an image at the determined location.

2. The information collecting apparatus according to claim 1, wherein:
    the image sensor is included in a camera configured to acquire and output the image.

3. The information collecting apparatus according to claim 1 further comprising:
    a main body which supports the arm and has a movement mechanism; wherein
    the processor is further configured to
    upon receipt of the instruction, determine a target location of the main body,
    control the movement mechanism to move the main body to the determined target location before controlling the arm drive mechanism, and
    after the main body has reached the target location, control the arm drive mechanism to horizontally and vertically move the arm to the determined position.

4. The information collecting apparatus according to claim 3, wherein
    the processor is configured to
    control the arm drive mechanism to horizontally and vertically move the arm to the determined position so that the image sensor is positioned above the article placed on the shelf, and
    after the image sensor is positioned above the article, control the image sensor to acquire the image while controlling the movement mechanism to move the main body.

5. An information collecting system, comprising:
    an information collecting apparatus configured to collect information of an article placed on a shelf; and
    a host apparatus configured to process the information of the article which has been collected by the information collecting apparatus, wherein
    the information collecting apparatus comprises:
    an image sensor,
    an arm which supports the image sensor and is movable in both horizontal and vertical directions,
    an arm drive mechanism configured to move the arm,
    a communication interface configured to communicate with the host apparatus, and
    a processor configured to
    upon receipt of an instruction to acquire information about an article from the host apparatus, determine a location on a shelf on which the article is placed based on an entry in a database, and determine a position for the arm to be moved based on the determined location,
    control the arm drive mechanism to horizontally and vertically move the arm to the determined position,
    when the arm is positioned at the determined position, control the image sensor to acquire an image at the determined location, and
    transmits the acquired image to the host apparatus via the communication interface.

6. The information collecting system according to claim 5, wherein:
    the image sensor is included in a camera configured to acquire and output the image.

7. The information collecting system according to claim 5 wherein
    the information collecting apparatus further comprises:
    a main body which supports the arm and has a movement mechanism, and
    the processor is further configured to
    upon receipt of the instruction, determine a target location of the main body,
    control the movement mechanism to move the main body to the determined target location before controlling the arm drive mechanism, and
    after the main body has reached the target location, control the arm drive mechanism to horizontally and vertically move the arm to the determined position.

8. The information collecting system according to claim 7, wherein
    the processor is configured to control the arm drive mechanism to horizontally and vertically move the arm to the determined position so that the image sensor is positioned above the article placed on the shelf, and after the image sensor is positioned above the article, control the image sensor to acquire the image while controlling the movement mechanism to move the main body.

9. An information collecting method of collecting information of an article placed on a shelf, the method comprising:

upon receipt of an instruction to acquire information about an article, determining a location on a shelf on which the article is placed based on an entry in a database, and determining a position for an arm, which has an image sensor, to be moved based on the determined location;

horizontally and vertically moving the arm to the determined position; and when the arm is positioned at the determined position, controlling the image sensor to acquire an image at the determined location.

10. The information collecting method according to claim 9 further comprising:

upon receipt of the instruction, determining a target location of a main body that supports the arm and has a moving mechanism; and controlling the moving mechanism to move the main body to the target location before moving the arm.

11. The information collection apparatus according to claim 1, wherein the image sensor acquires the image from above the article placed on the shelf.

12. The information collection apparatus according to claim 1, further comprising:

a plurality of image sensors attached to the arm and configured to acquire images.

13. The information collection apparatus according to claim 1, wherein the arm drive mechanism includes a horizontal link mechanism configured to move the arm in the horizontal direction and a vertical movement mechanism configured to move the arm in the vertical direction.

14. The information collection system according to claim 5, wherein the image sensor acquires the image from above the article placed on the shelf.

15. The information collection system according to claim 5, wherein the information collecting apparatus further comprises a plurality of image sensors attached to the arm and configured to acquire images.

16. The information collection system according to claim 5, wherein the arm drive mechanism includes a horizontal link mechanism configured to move the arm in the horizontal direction and a vertical movement mechanism configured to move the arm in the vertical direction.

17. The information collection method according to claim 9, wherein the image is acquired by the image sensor from above the article placed on the shelf.

18. The information collection method according to claim 9, wherein a plurality of image sensors is attached to the arm to acquire images.

19. The information collection method according to claim 9, wherein the arm is moved in the horizontal direction by a horizontal link mechanism and in the vertical direction by a vertical movement mechanism.

* * * * *